Patented Jan. 10, 1950

2,493,896

UNITED STATES PATENT OFFICE 2,493,896

PREPARATION OF SILICA-ALUMINA CATALYST

William A. Pardee, Pittsburgh, and George E. Elliott, Jr., Oakmont, Pa., assignors to Gulf Research & Development Company, Pittsburgh, Pa., a corporation of Delaware No Drawing. Application December 5, 1947, Serial No. 790,024

8 Claims. (Cl. 252—455)

This invention relates to an improved method for preparing a silica-alumina catalyst and to an improved silica-alumina catalyst.

It has been previously known to prepare silica-alumina catalysts by treating alumina with certain compounds of silicon which can be hydrolyzed to form a deposit of silica. The alumina impregnated with such a silicon compound was treated with water or other hydrolyzing agent to deposit silica on the alumina, and the product thus formed was heated to obtain the silica-alumina catalyst product. This method of preparation is not only expensive and complicated but also does not result in as active a catalyst as could be prepared under conditions of the present invention.

This invention has for its object to provide an improved method for preparing a silica-alumina catalyst. Another object is to provide an improved method for directly depositing silica upon alumina. A still further object is to provide a simple and economical method for depositing silica upon alumina. A still further object is to provide a simple and economical method for depositing silica upon alumina by using a silicon compound which can be decomposed into silica. Other objects will appear hereinafter.

These and other objects are accomplished by our invention which includes impregnating alumina with a compound which yields silica on thermal decomposition and thermally decomposing said compound to deposit silica on the alumina.

In the present invention an active alumina material is impregnated with a solution containing a silicon compound which will decompose when heated in the presence of said alumina material without an added hydrolysis agent and leave a deposit of hydrated silica on said alumina. The decomposition reaction takes place in the presence of the active alumina at a much lower temperature than in the absence of this material indicating that the extended alumina surface accelerates the reaction. Future reference in this specification to decomposition of the silicate material implies decomposition as above described in the absence of an added hydrolysis agent.

In the following examples and description we have given several of the preferred embodiments of our invention but it is to be understood that these are set forth for the purpose of illustration and not in limitation thereof.

Examples of suitable compounds for depositing hydrated silica on alumina are alkyl silicates, such as tetraethyl-o-silicate and methyl silicate and their polymers; glycol silicate, and the various silicones and amino silanes. An ethylsilicate polymer giving excellent results is a material marketed as Ethylsilicate-40, containing an equivalent of about 40 per cent $SiO_2$. All of these materials when heated in contact with alumina decompose to deposit hydrated silica on the alumina. These compounds may be contacted with the alumina in any convenient manner. For instance, they may be merely added to and stirred with particles, pills or pellets of alumina. However, it may be desirable to dissolve the silicon compound in a solvent such as a low boiling alcohol or ketone and contact this solution with the alumina. Evacuation of air from the alumina followed by adsorption of the silicon compound may be used to increase the degree of penetration into the pores of the alumina and thereby increase the degree of adsorption.

After sufficient contact with the silicon compound, or its solution, the alumina is separated from the excess or unadsorbed silicon compound or solution. The mass is then heated to a temperature below the boiling point of the silicon compound and held at that temperature until the mass is relatively dry. During this heating the silicon compound is broken down to yield a deposit of hydrated silica. The mass is then heated to a higher temperature to complete the decomposition of the silicon compound and to condition the silica-alumina mixture for use as a catalyst. This latter step is known as calcining. The initial decomposition below the boiling point of the silicon compound is preferred for high depositions of silica. Somewhat lower silica deposits are obtained if the initial heating is carried out above the boiling point of the silicon compound. Deposition of about 1 to 50 per cent and especially 10 to 40 per cent by weight of silica gives desirable cracking catalysts.

If the desired quantity of silica deposit is not obtained in a single impregnation then the above process is repeated until the desired amount is reached. It has been found that following the above procedure for each impregnation gives preferred catalysts. That is, calcining of the catalyst after each impregnation produces better catalysts than when the calcining step is omitted. We have found, however, that a better catalyst results if a compound containing a high concentration of silica, such as a polymer of ethylsilicate containing 40 per cent silica equivalent (known commercially as Ethylsilicate-40) is used to obtain a high silica deposit instead of multiple impregnation using a lower silica-content compound. Such compounds have the advantage also of being less expensive on the basis of their SiO₂ content.

The pure silicates mentioned above generally have definite boiling points. The polymer mixtures boil over a range of temperatures above the boiling point of the pure compounds. Therefore, the term "boiling point" as used in the specification and claims is intended to designate, in the case of mixtures having boiling ranges rather than boiling points, the temperature at which the mixture begins to boil and to designate, in the case of a pure compound, the specific temperature at which such pure compound boils. Pure tetraethyl-o-silicate has a definite boiling point of 329.9° F. and is considered to be thermally stable at several hundred degrees above this temperature. The other silicon compounds likewise are thermally stable at temperatures above their boiling points. However, when these materials are deposited on alumina, there is decomposition to silica at temperatures below the boiling point, indicating that the decomposition is catalyzed by the alumina. Ethylsilicate adsorbed on an active alumina decomposes on heating to leave almost a theoretical deposit of silica. This decomposition makes possible the deposition of silica on alumina without substantial volatilization of the silicon compound. It will be apparent from the foregoing that a wide range of temperatures can be used, i. e. any temperature which causes decomposition of the silicon compound into silica. While we prefer to use a temperature below the boiling point of the silicon compound for the initial decomposition step, higher temperatures may be used. In general, a range of 100° F. to 500° F. may be used. In the calcining treatment, temperatures in the range of 500° F. to 1500° F. are satisfactory, the higher temperatures being preferred.

Any type of alumina, synthetic or natural, which has a relatively large surface area such as is common in catalyst carriers can be used. These aluminas are preferably low in alkali. Thus where we speak of alumina we mean activated aluminas of this type. Also when we speak of silica we mean hydrated silicas.

*Example*

The following is an example of a typical catalyst preparation according to this invention.

1563 grams of activated alumina, having been dried by heating to about 1000° F. overnight, was evacuated to 5–10 mm. Hg for about 80 minutes. A sufficient quantity of an ethylsilicate polymer (40 per cent SiO₂ equivalent) was charged to the evacuated flask to completely cover the alumina. After five minutes the vacuum was released, and the mixture was allowed to stand about 25 minutes at atmospheric pressure. The excess liquid was then drained from the solid mass which weighed 2293 grams indicating a gain of about 731 grams. The estimated silica deposit was 0.40×731=292 grams, or about 15.7 per cent by weight of the finally calcined material. The wet impregnated mass was decomposed at about 240° F. for about 24 hours and then charged to an electric muffle furnace and heated to about 970° F., with air being drawn over the surface for about 14 hours. This calcined material weighed 1852 grams, indicating a deposit of about 15.6 per cent as compared with the estimated deposit of 15.7 per cent.

When our catalysts are used for cracking, temperatures in the range of about 650° to 1000° F. may be used. Temperatures of about 700° to 900° F. are preferred. One advantage of these catalysts is their desirable activity at low temperatures, such as 750° F. Several catalysts prepared by this invention reach their highest gasoline yields at these low temperatures. For instance a catalyst containing 32.7 per cent silica and 62.3 per cent active alumina prepared in accordance with our invention exhibited a peak of maximum gasoline yield of approximately 35 per cent by weight at 750° F. This is a distinct advantage from an engineering standpoint over presently used catalysts since it results in heat economies. The cracking activity of the finished catalyst will vary with the starting alumina material and depends on the surface area and other properties of the alumina.

These catalysts likewise have desirable aging characteristics, as shown in the accentuated aging test of steaming the catalysts at 1350° F. for 6 hours. A comparison is made in Table I with a conventional cracking catalyst.

*Table I*

| Catalyst | Conversion Temperature | Gasoline yield before Steaming | Yield after Steaming |
|---|---|---|---|
| | °F. | | |
| A¹ | 840 | 33 | 23.2 |
| B² | 840 | 32.8 | 23.8 |

¹ Conventional widely used silica-alumina commercial cracking catalyst.
² Catalyst prepared by this invention.

Catalysts prepared by this invention have superior cracking activities and greater surface areas than catalysts prepared according to the hydrolysis method, as known to the art. This is shown in Table II, wherein all test conditions were identical except for the catalyst.

*Table II*

| Catalyst | Composition | | Surface Area, Sq. Meters/gram. | Conversion Temp. | Yields | |
|---|---|---|---|---|---|---|
| | Per Cent SiO₂ | Per Cent Al₂O₃ | | | Gasoline | Gas+Coke |
| C¹ | 13.8 | 86.2 | 137 | 840 | 25.3 | 11.8 |
| D² | 14.3 | 85.7 | 162 | 840 | 27.8 | 13.2 |

¹ Catalyst prepared by vacuum impregnation and hydrolysis.
² Catalyst prepared by vacuum impregnation and the thermal treatment of this invention.

It is therefore seen that hydrolysis of the organic silicon compound prior to calcining is not only unnecessary, but that there are definite advantages to be gained by avoiding hydrolysis and using our method of thermal decomposition of the silicon compound. It was also noted during these tests that, on the basis of the amount absorbed on the alumina, almost complete deposition is obtained by the process of the invention whereas the hydrolysis procedure results in a lower deposition of silica from the organic silicon compound.

What we claim is:

1. A method for preparing a silica-alumina catalyst which comprises depositing on activated alumina an organic compound capable of yielding silica when subjected to heat and the catalytic influence of activated alumina, said organic compound being deposited on the alumina in amount sufficient to yield a silica-alumina catalyst containing between about 1 and 50 per cent silica by weight, heating the mixture of alumina and the organic compound deposited thereon to a temperature sufficient to catalytically decompose the deposited organic compound into silica without causing it to distill, and thereafter calcining the resultant product.

2. A method for preparing a silica-alumina catalyst which comprises depositing on activated alumina an organic compound capable of yielding silica when subjected to heat and the catalytic influence of activated alumina, said organic compound being deposited on the alumina in amount sufficient to yield a silica-alumina catalyst containing between about 1 and 50 per cent silica by weight, heating the mixture of alumina and the compound deposited thereon to catalytically decompose the deposited organic compound and form silica on the alumina, and thereafter calcining the resultant product.

3. A method for preparing a silica-alumina catalyst which comprises depositing on activated alumina an alkyl silicate having a high silica content, said alkyl silicate being capable of yielding silica when subjected to heat and the catalytic influence of activated alumina, said alkyl silicate being deposited on the alumina in amount sufficient to yield a silica-alumina catalyst containing between about 10 and 40 per cent silica by weight, heating the mixture of alumina and the alkyl silicate deposited thereon to catalytically decompose the deposited alkyl silicate and form silica on the alumina, and thereafter calcining the resultant product.

4. A method for preparing a silica-alumina catalyst which comprises depositing on activated alumina a polymer of an alkyl silicate capable of yielding silica when subjected to heat and the catalytic influence of activated alumina, said alkyl silicate being deposited in amount sufficient to yield a silica-alumina catalyst containing between about 10 and 40 per cent silica by weight, heating the mixture of alumina and the polymer of an alkyl silicate deposited thereon to a temperature at which catalytic decomposition of the alkyl silicate takes place to form silica on the alumina, and thereafter calcining the resultant product.

5. A method for preparing a silica-alumina catalyst which comprises depositing on activated alumina an organic compound capable of yielding silica when subjected to heat and the catalytic influence of activated alumina, said compound being deposited in amount sufficient to yield a silica-alumina catalyst containing between about 10 and 40 per cent silica by weight, heating the mixture of alumina and the organic compound deposited thereon to a temperature below the boiling point of said organic compound to catalytically decompose said compound and form silica on the alumina, and thereafter calcining the resultant product.

6. A method for preparing a silica-alumina catalyst which comprises depositing on activated alumina an organic compound capable of yielding silica when subjected to heat and the catalytic influence of activated alumina, said compound being deposited in amount sufficient to form a catalyst which contains between about 10 and 40 per cent silica by weight, heating the mixture of alumina and the organic compound deposited thereon to a temperature between about 100° and 500° F. to catalytically decompose said organic compound and form silica on the alumina, and thereafter calcining the resultant product at a temperature between about 500° and 1500° F.

7. A method for preparing a silica-alumina catalyst which comprises performing a single impregnation of activated alumina with an alkyl silicate, said alkyl silicate containing about 40 per cent silica equivalent and being capable of yielding silica when subjected to heat and the catalytic influence of activated alumina, said alkyl silicate being employed in amount sufficient to yield a catalyst containing between about 10 and 40 per cent silica by weight, heating the mixture of alumina and alkyl silicate deposited thereon to a temperature below the boiling point of said alkyl silicate to catalytically decompose said alkyl silicate and form silica on the alumina, and thereafter calcining the resultant product.

8. A method for preparing a silica-alumina catalyst which comprises depositing on activated alumina and organic compound capable of yielding silica when subjected to heat and the catalytic influence of activated alumina, said compound being deposited in amount sufficient to yield a silica-alumina catalyst containing between about 1 and 50 per cent silica by weight, heating the mixture of alumina and the organic compound deposited thereon to a temperature below the boiling point of said organic compound to catalytically decompose said compound and form silica on the alumina.

WILLIAM A. PARDEE.
GEORGE E. ELLIOTT, Jr.

REFERENCES CITED

The following references are of record in the file of this patent:

UNITED STATES PATENTS

| Number | Name | Date |
| --- | --- | --- |
| 2,154,079 | Weiss | Apr. 11, 1939 |
| 2,243,404 | Voorhies | May 27, 1941 |
| 2,285,314 | Thomas et al. | June 2, 1942 |
| 2,394,796 | Marisic | Feb. 12, 1946 |

Certificate of Correction

Patent No. 2,493,896                                                January 10, 1950

WILLIAM A. PARDEE ET AL.

It is hereby certified that error appears in the printed specification of the above numbered patent requiring correction as follows:

Column 6, line 35, for the words "and organic" read *an organic*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*